United States Patent
Kao et al.

(10) Patent No.: US 8,306,125 B2
(45) Date of Patent: Nov. 6, 2012

(54) 2-BIN PARALLEL DECODER FOR ADVANCED VIDEO PROCESSING

(75) Inventors: I-pieng Peter Kao, Sunnyvale, CA (US); Jack Benkual, Cupertino, CA (US)

(73) Assignees: Digital Video Systems, Inc., Mountain View, CA (US); Mstar Semiconductor, Inc., Chupei, Hsinchu Hsien (TW)

( * ) Notice: Subject to any disclaimer, the term of this patent is extended or adjusted under 35 U.S.C. 154(b) by 1470 days.

(21) Appl. No.: 11/755,698

(22) Filed: May 30, 2007

(65) Prior Publication Data
US 2009/0196355 A1    Aug. 6, 2009

Related U.S. Application Data

(60) Provisional application No. 60/815,749, filed on Jun. 21, 2006.

(51) Int. Cl.
*H04N 11/02* (2006.01)
*H03M 7/00* (2006.01)

(52) U.S. Cl. .................................. 375/240.25; 341/107

(58) Field of Classification Search ......... 375/240.23–240.25, E07.001; 382/236, 239, 247; 341/107
See application file for complete search history.

(56) References Cited

U.S. PATENT DOCUMENTS

| | | | |
|---|---|---|---|
| 7,262,722 B1 * | 8/2007 | Jahanghir et al. | 341/107 |
| 2001/0005235 A1 * | 6/2001 | Goseki | 348/663 |
| 2002/0163961 A1 * | 11/2002 | Birru | 375/233 |
| 2002/0184594 A1 * | 12/2002 | Singvall | 714/786 |
| 2003/0219072 A1 * | 11/2003 | MacInnis et al. | 375/240.25 |
| 2004/0123228 A1 * | 6/2004 | Kikuchi et al. | 714/800 |
| 2006/0126744 A1 * | 6/2006 | Peng et al. | 375/240.26 |

* cited by examiner

*Primary Examiner* — Gilberto Barron, Jr.
*Assistant Examiner* — David Le
(74) *Attorney, Agent, or Firm* — Sawyer Law Group, P.C.

(57) ABSTRACT

A critical phase of video processing is the decoding of bit streams coming from standard based heavy compressed sources. Entropy coding can be effectively decoded by adopting parallelism to speed up the process. Reasonable assumptions make possible for example the multiple bits at a time processing for the Context-based Adaptive Binary Arithmetic Coding (CABAC) algorithm. In particular, a clever arithmetic section reduces single propagation for the timing critical path while decoding done for only two sequence elements at a time by calculating and maintaining most probable bit values. This in turn making accelerated path using pre-determined probability outcome through parallelism not cost.

17 Claims, 12 Drawing Sheets

| 801 | 802 | 803 | 804 | 805 | 806 | | |
|---|---|---|---|---|---|---|---|
| last_signif | valMPS0 | selMPS0 | dec2bin | valMPS1 | selMPS1 | Sel1 | Nxt_Ptr |
| 0 | 0 | 0 | - | - | - | Ptr+2 | Ptr+1 |
| 0 | 0 | 1 | 0 | - | - | Ptr+2 | Ptr+2 |
| 0 | 0 | 1 | 1 | 0 | 0 | Ptr+2 | Ptr+3 |
| 0 | 0 | 1 | 1 | 0 | 1 | Ptr+2 | Ptr+4 |
| 0 | 0 | 1 | 1 | 1 | 0 | Ptr+2 | Ptr+4 |
| 0 | 0 | 1 | 1 | 1 | 1 | Ptr+2 | Ptr+3 |
| 0 | 1 | 0 | - | - | - | Ptr+1 | Ptr+1 |
| 0 | 1 | 1 | 0 | - | - | Ptr+1 | Ptr+1 |
| 0 | 1 | 1 | 1 | 0 | 0 | Ptr+1 | coeff_abs_val |
| 0 | 1 | 1 | 1 | 0 | 1 | Ptr+1 | Ptr+2 |
| 0 | 1 | 1 | 1 | 1 | 0 | Ptr+1 | Ptr+2 |
| 0 | 1 | 1 | 1 | 1 | 1 | Ptr+1 | coeff_abs_val |
| 1 | 0 | 0 | - | - | - | Ptr+1 | coeff_abs_val |
| 1 | 0 | 1 | 0 | - | - | Ptr+1 | Ptr+1 |
| 1 | 0 | 1 | 1 | 0 | 0 | Ptr+1 | Ptr+2 |
| 1 | 0 | 1 | 1 | 0 | 1 | Ptr+1 | Ptr+3 |
| 1 | 0 | 1 | 1 | 1 | 0 | Ptr+1 | Ptr+3 |
| 1 | 0 | 1 | 1 | 1 | 1 | Ptr+1 | Ptr+2 |
| 1 | 1 | 0 | - | - | - | Ptr+1 | Ptr+1 |
| 1 | 1 | 1 | - | - | - | Ptr+1 | coeff_abs_val |

FIG. 8

| Current | | | Next | | |
|---|---|---|---|---|---|
| GrtOne | num | DecEq1 | GrtOne | num | Comment |
| 0 | n | 1 | 0 | n+1 | sat at 3 |
| 0 | n | 0 | 1 | 1 | |
| 1 | n | 1 | 1 | n | |
| 1 | n | 0 | 1 | n+1 | sat at 3 |

2-BIN PARALLEL DECODER FOR ADVANCED VIDEO PROCESSING

CROSS-REFERENCE TO RELATED APPLICATIONS

This application claims the benefit of priority to U.S. Provisional Application No. 60/815,749, filed Jun. 21, 2006, entitled "DVD Decoder Solution", all of which is incorporated herein, by reference.

FIELD OF THE INVENTION

The present invention relates to adopting parallelism to provide decoding for industrial standard based video processing.

DESCRIPTION OF THE RELATED ART

There are a number of industrial standards that describe the standard way that video or movie processing should be based on as far as the standard body is concerned. Vendor's systems typically conform to these standards, such as the universal plug-and-play (UPnP) standard and the upcoming all encompassing MPEG-4 standard, as well as old existing standards, such as the VHS format to provide audio/visual (AV) capability. MPEG-4 Part 10 (formally, ISO/IEC 14496-10) is a digital video codec standard which is noted for achieving very high data compression. The ITU-T H.264 standard and the ISO/IEC MPEG-4 Part 10 standard are technically identical. The standard is also known as AVC, for Advanced Video Coding or JVT, for Joint Video Team, as it is a collective partnership effort by the ITU-T Video Coding Experts Group (VCEG) together with the ISO/IEC Moving Picture Experts Group (MPEG).

Even using current compression technology, a standard 2-hour movie may take from 1 to 4 hours to download from the Internet. This time could get longer when processing is interrupted by errors. Therefore, a need arises for a method and system of quickly processing AV content. The invention of this patent based on the provisional patent application entitled "DVD DECODER SOLUTION" describes herein a method by adopting parallelism to accelerate the decoding of the video processing algorithm.

SUMMARY OF THE INVENTION

The H.264 plays a crucial role in providing video compression for standard Internet Definition, High Definition, Full High Definition, as well as Mobile Content. It reduces the transmission rates for required resolution and frame rates.

A typical video processing sequence for DVD or broadcast includes encoding and decoding phases. The encoding consists of spatial and temporal prediction, transform, quantization, scanning and variable length coding or arithmetic coding, also called entropy coding. In H.264, the Context-based Adaptive Binary Arithmetic Coding (CABAC) is used. The decoding phase consists of decoding and post-processing and error recovery. It is in the area of decoding that this invention is addressed. Specifically, parallelism is adopted to accelerate the speed of decoding.

In accordance with one aspect of the invention, an efficient parallel algorithm for decoding multiple bits at a time from a bitstream encoded using the CABAC algorithm. The implementation of the algorithm assumes that the Most Probable bit values will be decoded for all bits except the last bit decoded. It is further assumed that the next quantized range used to decode the next bit is highly predictable using the current range value and the current probability state. We further assert that only two sequence elements decoding needs to be accelerated to speed up significantly the decoding process. We claim these assumptions hold for most encoded bit streams encoding a large variety of motion pictures and our implementation is as fast as the single bit sequential implementation when the above assumptions do not hold.

In one embodiment, the implementation of the arithmetic section using carry save adders is unique, reducing to single carry propagation for the timing critical adder paths. Our solutions are also applicable to other similar sequential problems that need to be accelerated. Since the result of the decoding of a given bit influences the decoding of the next bit, devising parallel or pipelined implementation of this algorithm is particularly challenging.

DETAILED DESCRIPTION

In the area of entropy coding in video processing, the CABAC has several beneficial characteristics. These include the usage of adaptive probability models for most symbols, exploiting symbol correlations by using contents, simple and fast adaptation mechanism and fast binary arithmetic codec based on table look-ups and shifts only. The average bit-rate saving over CABAC over CAVLC is around 10 to 15 percent and is adopted by H.264 as standard.

The decoder decision algorithm for CABAC is a sequential algorithm that decodes one bit at a time. For High Definition video resolution where pictures are encoded using a high bit rate, decoding one bit at a time is found to be too slow for some movie sequences. In our solution, we take advantage of the calculated probabilities of the decoded bit values and only accelerate the paths for the most probable outcomes. Since the arithmetic decoders already calculate these probabilities and maintain the probable decoded bit values, the decision-making overhead for our parallel implementation is relatively small.

Figure 1:
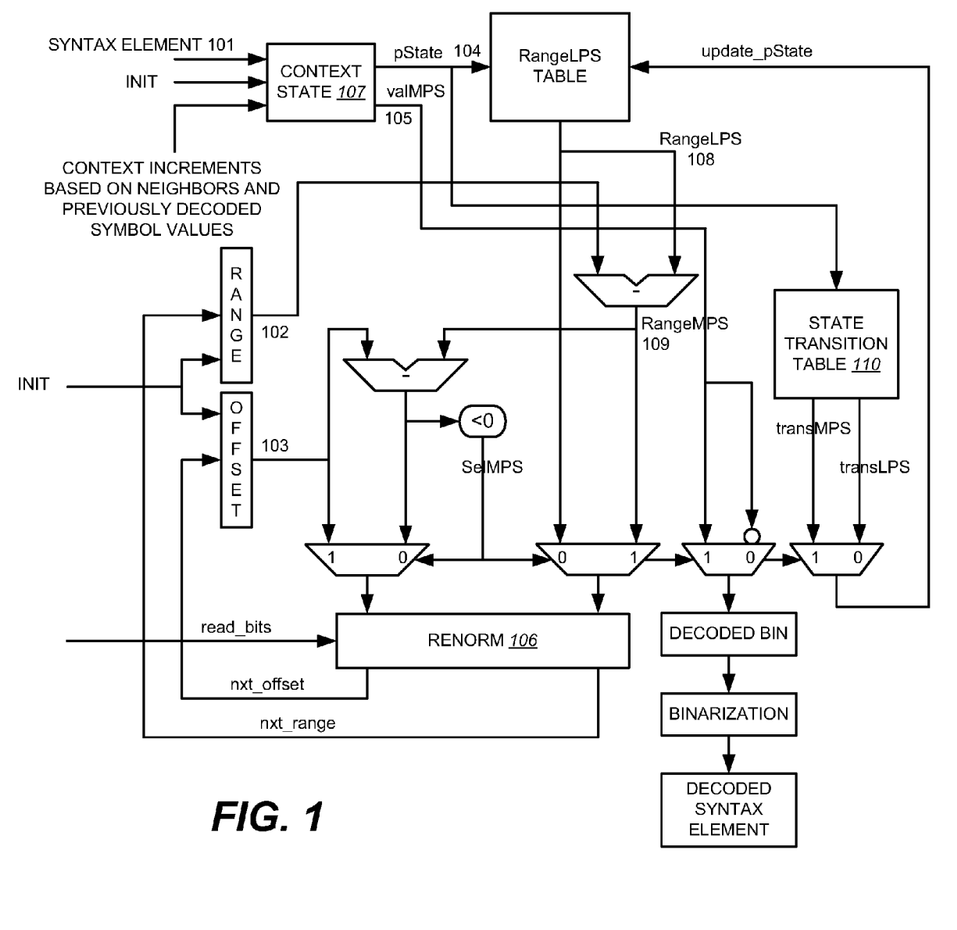
FIG. 1 depicts a CABAC 1-bit Decode Implementation.
Figure 2:
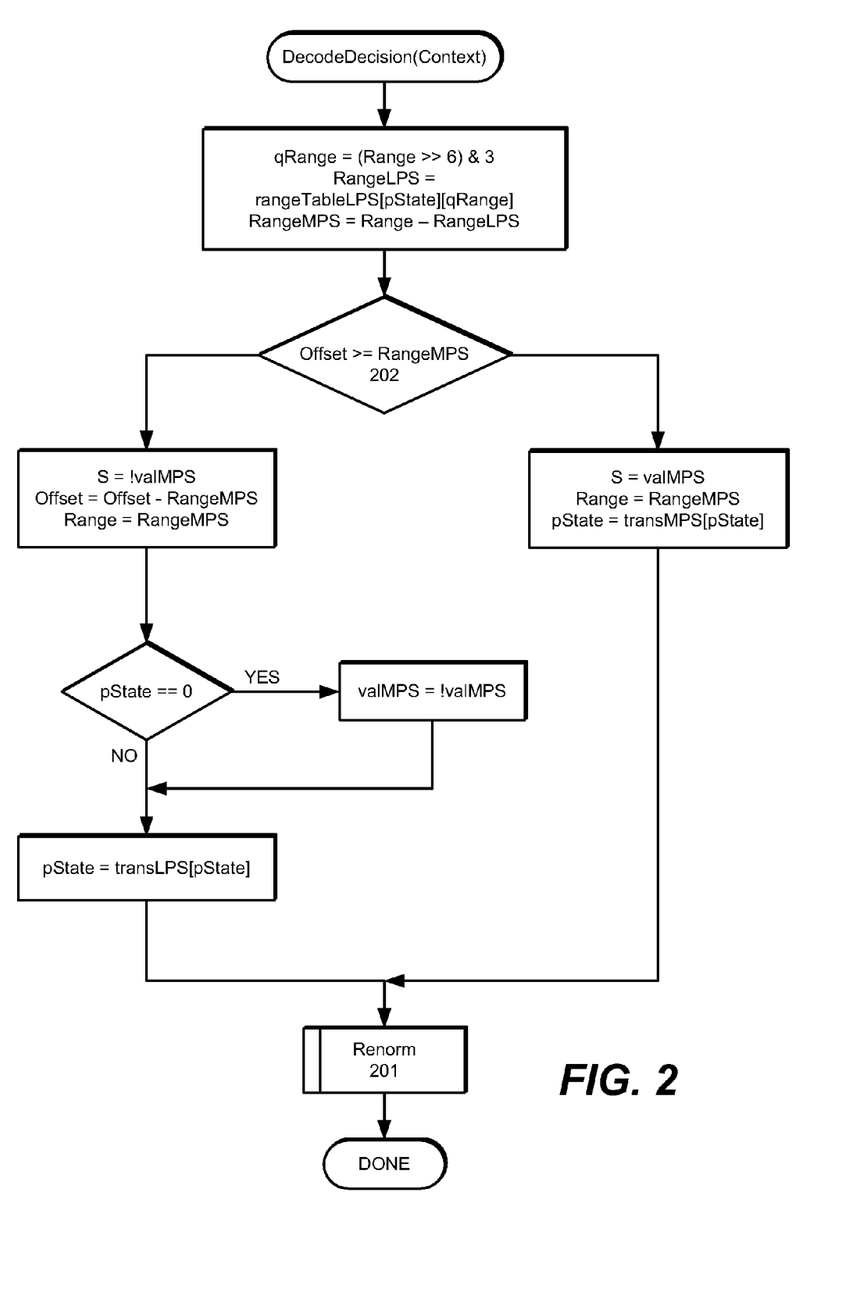
FIG. 2 shows the 1-bit Decode Decision Flow Chart.

FIG. 1 depicts a 1-bit decode implementation for the CABAC option specified by the JVT. The decision algorithm for the decoder is shown in FIG. 2. The inputs to the decoding process are the coded bit stream 101, Range 102, Offset 103, pState 104, and valMPS 105. The outputs are the next values for Range, Offset, the new values of the pair of pState, valMPS for the current Context, and the decoded bin value.

Figure 3:
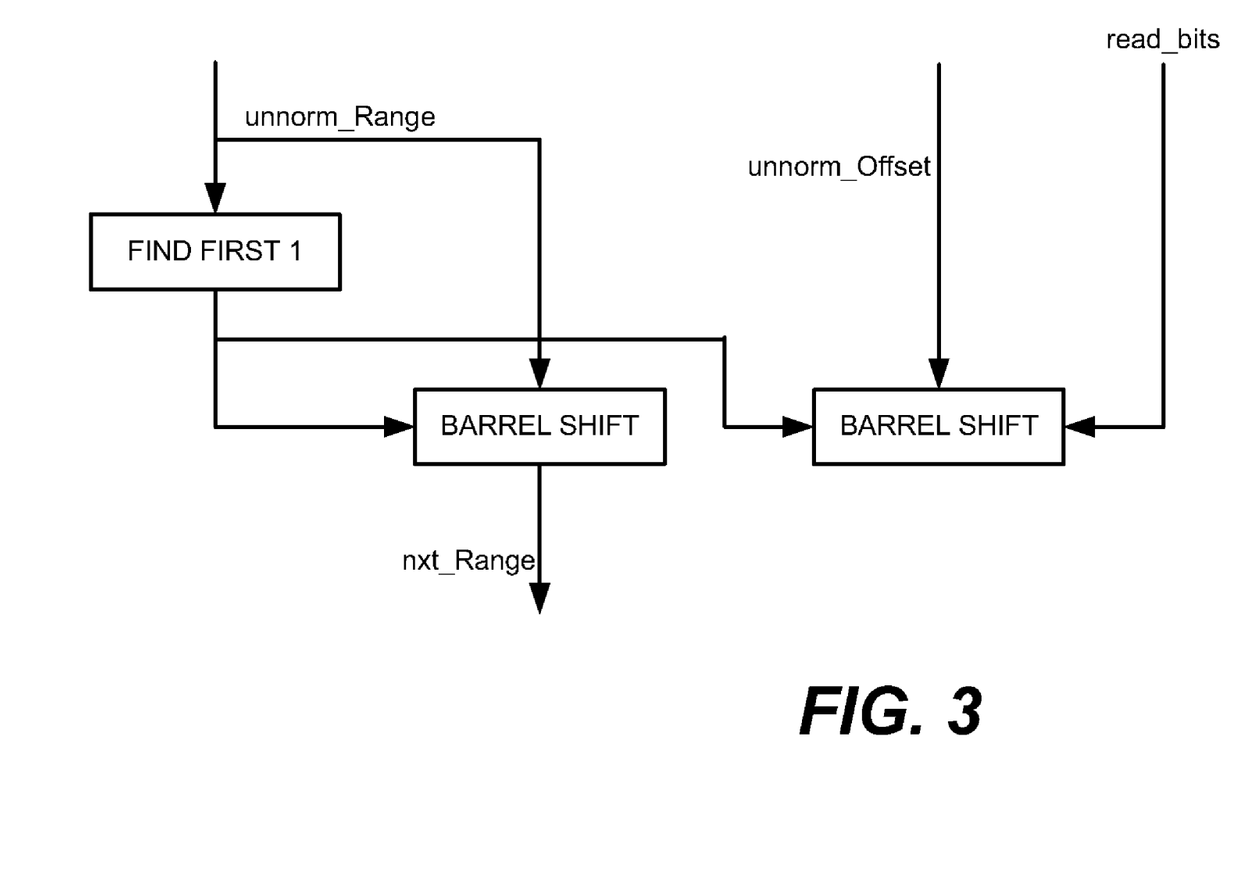
FIG. 3 depicts a CABAC Renorm Implementation.
Figure 4:
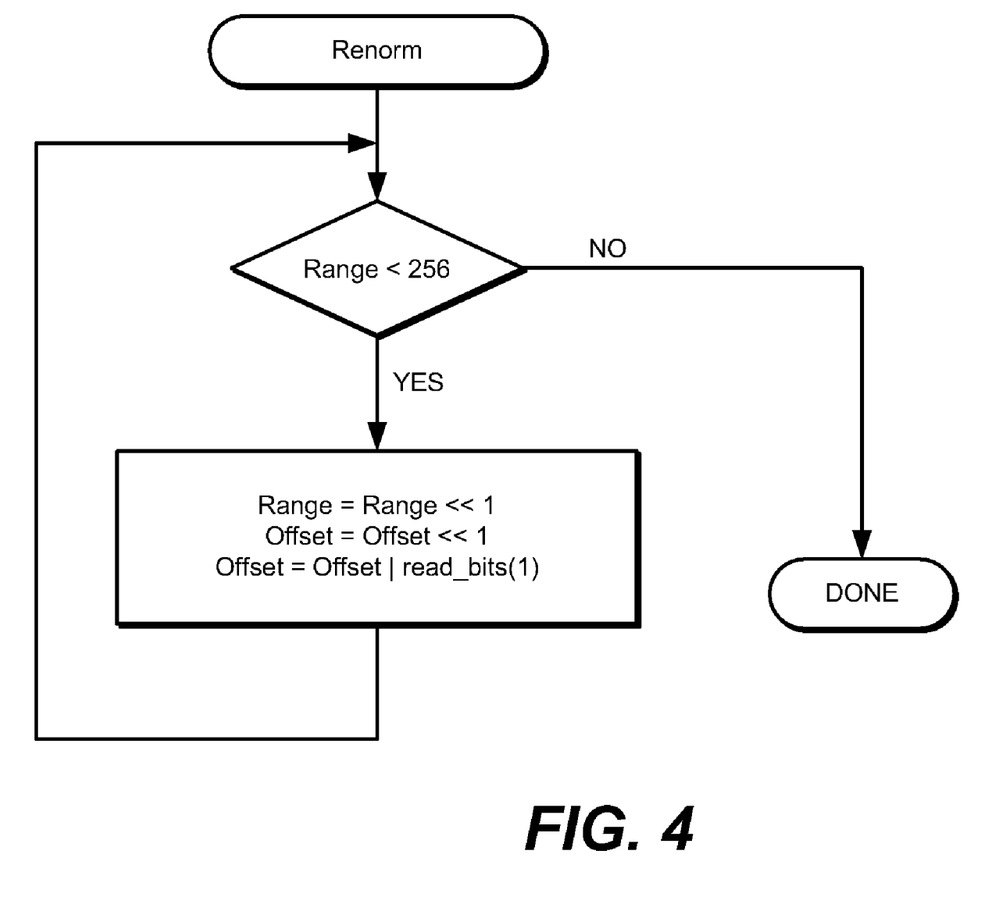
FIG. 4 shows the Renorm Flow Chart.

The Range and Offset are two 9-bit values that are used to determine the decoded bin. The Range changes for every bin that gets decoded. The Offset changes when a LPS (least Probable Symbol) is decoded or when the Range becomes smaller than the Offset. When the Range becomes less than 256, a renormalization process 106 201 shifts in new bits from the encoded bit stream into the least significant bits of the Offset and shifts left (multiplies by 2) the Range until it is larger or equal to 256. FIG. 3 depicts a CABAC Renorm Implementation. FIG. 4 shows the Renorm Flow Chart. At the beginning of Slice decoding process Range is initialized to the value of 510 and Offset to the next 9 bits from the encoded stream.

The pState and valMPS are associated to a Context 107. A Context distinguishes a sequence element that is coded through a binarization process, a bit position, and alternatives depending on past decoding history. Context numbers vary from 0 to 398. In some cases the Context number for the next bin depends on the result of the currently decoded bin. In other cases the same Context is used to decode a consecutive number of bins of a sequence element. The pState is a quantized probability of decoding a bin that its value equal to valMPS. The pState varies between 0 and 63, where 0 represent a probability close to 50% and 63 a value close to 100%. The valMPS represents the most probable bin value, either 0 or 1.

The first step of the Arithmetic Decoding consists of determining the value RangeLPS 108. This is achieved by a table lookup using the pState input and the bits 7 and 6 of the Range input. The RangeLPS is subtracted from Range to form the value of RangeMPS 109. The Offset is compared 202 against RangeMPS. If RangeMPS is larger than Offset, we are decoding valMPS, RangeMPS becomes the Range value and Offset remains unchanged prior to Renormalization. A transMPS table 110 lookup determines the new pState value. Otherwise, if Offset is larger or equal to RangeMPS, the inverse of valMPS is decoded. In this unlikely outcome, the next Offset value (before Renorm) is obtained by subtracting RangeMPS from Offset, and the RangeLPS is used as the next Range value prior to Renorm. If the current pState is zero the new valMPS for the current Context is flipped. The new pState value is obtained by transLPS table look-up.

Since RangeLPS is a number between 240 and 2, with smaller values for higher pState, the need for Renorm is certain if a Least Probable Symbol is decoded but diminishes with larger pState. The quantization of Range (bits 7 and 6) also affects the RangeLPS value by reducing it when the Range is smaller.

The H.264 Standard uses CABAC as an option to encode the macroblock picture frame information. The average encoded input bit stream rate is 20 Mbits/sec for High Definition resolution but peak rates can be much higher. Furthermore, CABAC uses relatively a simple binarization scheme relying mostly on the arithmetic coding ability to encode a long sequence of highly predictable binary symbols using a relatively small number of encoded bits. This means that when arithmetic coding is very efficient it will be decoding most probable bins without the need of modifying the Offset or reading more encoded bits from the input bit-stream through Renorm. When a least probable symbol is decoded or Renorm is required the input bit-stream rate will limit the performance requirement of the CABAC engine. Therefore, to reduce buffering and to effectively deal with the high throughput of decoded bins a scheme that can decode more than a single bin per cycle is very desirable.

There are multiple challenges to speed-up the CABAC decoding. First, there are multiple sequential steps that need be carried-on to decode a single bin. This makes it difficult to implement it in a single clock cycle at relatively high frequencies. Second, in most cases the resulting previous state and decoded symbol is used to decode the next symbol. This makes traditional speed-up techniques like pipelining and parallel execution very hard to implement. For example, part of the macroblock encoded syntax elements is a sequence of bits that represent the significant_coeff_flag followed by last-_significant_coeff in case a value of "1" was decoded as the corresponding significant_coeff_flag on the previous cycle. Since each encoded bit has a different Context number, the resultant decoded bit value determines the Context number to be used for the next bin, consequently the pState and valMPS values that are directly involved in evaluating the next bin decoding. In addition to that, the Range value (quantized using its bits 7, and 6) resulting from the previous bin decoding is needed to fetch the next RangeLPS value that is essential for the next bin decoding.

By predicting that multiple Most Probable Symbols to be decoded in a row the following simplifications can be made:

1. We assume that Offset[i]<RangeMPS[i] leading to the selection of the valMPS[i] for the ith cycle. Also, the next pStateIdx for Context[i] is easily evaluated.

2. No Renorm will be needed on the ith cycle.

3. valMPS[i] will be used to determine the next Context number, Context[i+1].

4. We assume that RangeLPS[i] will be a small value, yielding a RangeMPS[i], which becomes Range[i+1] to have a small change compared to Range[i]. More specifically we assume that RangeMPS[i] bits 7 and 6 are either equal or one less than the Range[i] bits 7 and 6.

For example to decode 2 bins at a time the following operations needed:

1. qRange[i]=(Range[i]>>6) & 3.
2. pState[i]=table_context_pState[Context[i]].
3. valMPS[i]=table_context_valMPS[Context[i]].
4. Context[i+1]=evaluate_next_context[valMPS[i]].
5. pState[i+1]=table_context_pState[Context[i+1]].
6. valMPS[i+1]=table_context_valMPS[Context[i+1]].
7. RangeLPS[i]=rangeTablLPS[qRange[i]][pState[i]].
8. Range[i+1]=RangeMPS[i]=Range[i]−RangeLPS[i].
9. RangeLPS0[$i$+1]=rangeTablLPS[qRange[i]][pState[i+1]].
10. RangeLPS1[$i$+1]=rangeTablLPS[qRange[i]-1][pState[$i$+1]].
11. Range0[$i$+2] RangeMPS0[$i$+1] Range[i]−RangeLPS[i]−RangeLPS0[$i$+1].
12. Range1[$i$+2] RangeMPS1[$i$+1] Range[i]−RangeLPS[i]−RangeLPS1[$i$+1].
13. OffsetLPS[i]=Offset_RangeMPS[i].
14. OffsetLPS0[$i$+1]=Offset−RangeMPS0[$i$+1].
15. OffsetLPS1[$i$+1]=Offset−RangeMPS1[$i$+1].
16. qRange[i+1]=(RangeMPS[i]>>6) & 3
17. IF (OffsetLPS[i]>=0) THEN
  a. Only one bin of value !valMPS[i] is decoded as the i-th bin.
  b. {Offset[i+1], Range[i+1]=Renorm({OffsetLPS[i], RangeLPS[i]}).
  c. IF (pState[i]==0) THEN valMPS[Context[i]]=!valMPS[i].
  d. pState[Context[i]]=transLPS[pState[i]].
18. ELSE IF (RangeMPS[i]<256||(qRange[i+1]!=qRange[i]&&qRange[i+1]!=qRange[i]−1) THEN
  a. Only one bin of value valMPS[i] is decoded as the i-th bin.

b. {Offset[i+1], Range[i+1]}=Renorm({Offset[i], RangeMPS[i]}).
c. pState[Context[i]]=transMPS[pState[i]].
19. ELSE IF (OffsetLPS0[*i*]>=0) THEN
a. Two bins are decoded: {valMPS[i], !valMPS[i+1]}.
b. IF (qRange[i+1]==qRange[i]) THEN
  i. {Offset[i+2], Range[i+2]}=Renorm({OffsetLPS0[*i*+1], RangeLPS0[*i*+1]}).
  ii. ELSE {Offset[i+2], Range[i+2]}=Renorm({OffsetLPS1[*i*+1], RangeLPS1[*i*+1]}).
c. IF (pState[i+1]==0) THEN valMPS[Context[i+1]]=!valMPS[i+1].
d. pState[Context[i]]=transMPS[pState[i]].
e. pState[Context[i+1]]=transLPS[pState[i+1]].
20. ELSE THEN
a. Two bins are decoded: {valMPS[i], valMPS[i+1]}.
b. IF (qRange[i+1]==qRange[i]) THEN
  i. {Offset[i+2], Range[i+2]}=Renorm({Offset, RangeMPS0[*i*+1]}).
  ii. ELSE {Offset[i+2], Range[i+2]}=Renorm({Offset, RangeMPS1[*i*+1]}).
c. pState[Context[i]]=transMPS[pState[i]].
d. pState[Context[i+1]]=transMPS[pState[i+1]].

Figure 5:
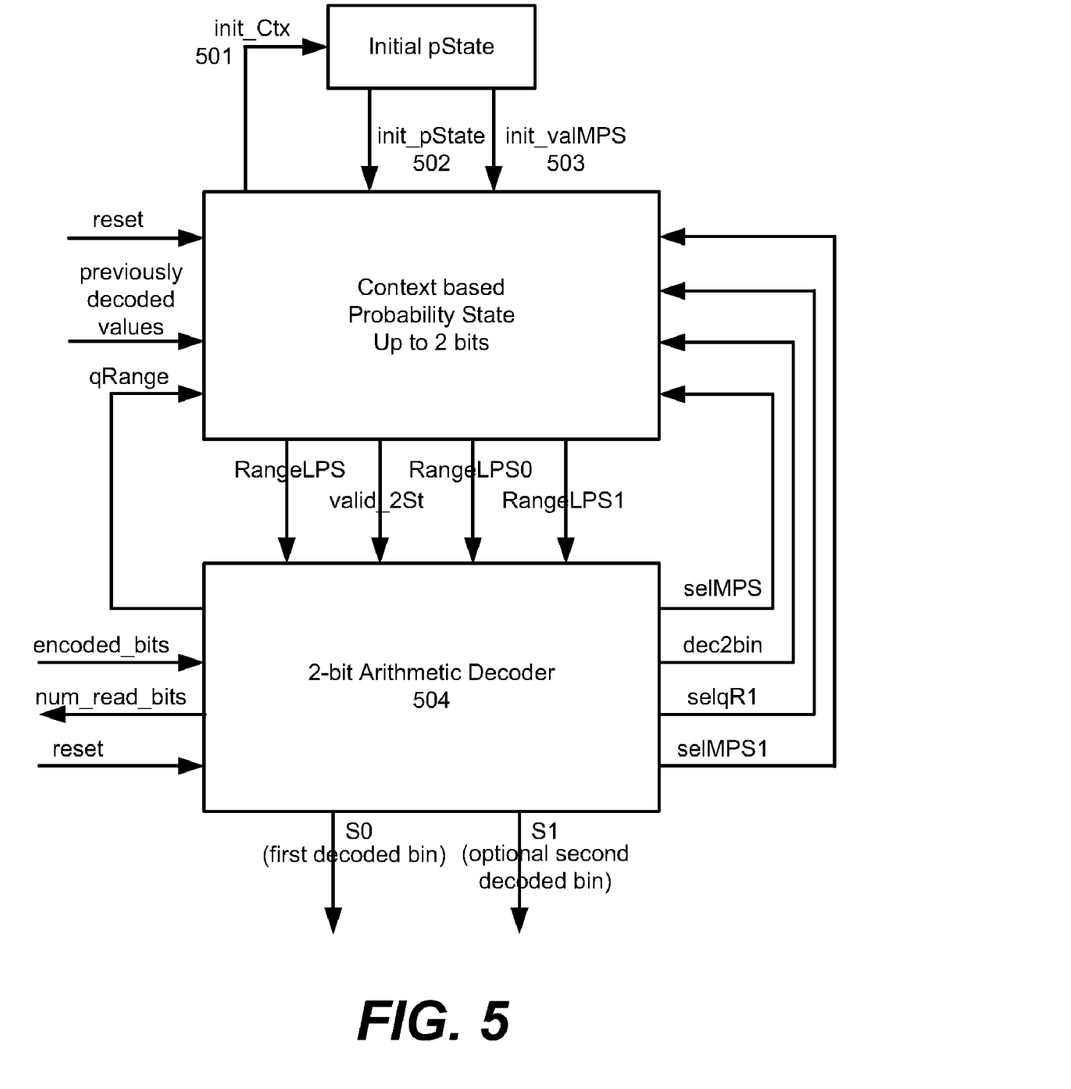
FIG. 5 illustrates the CABAC 2-bit Decode Block Diagram.
Figure 6:
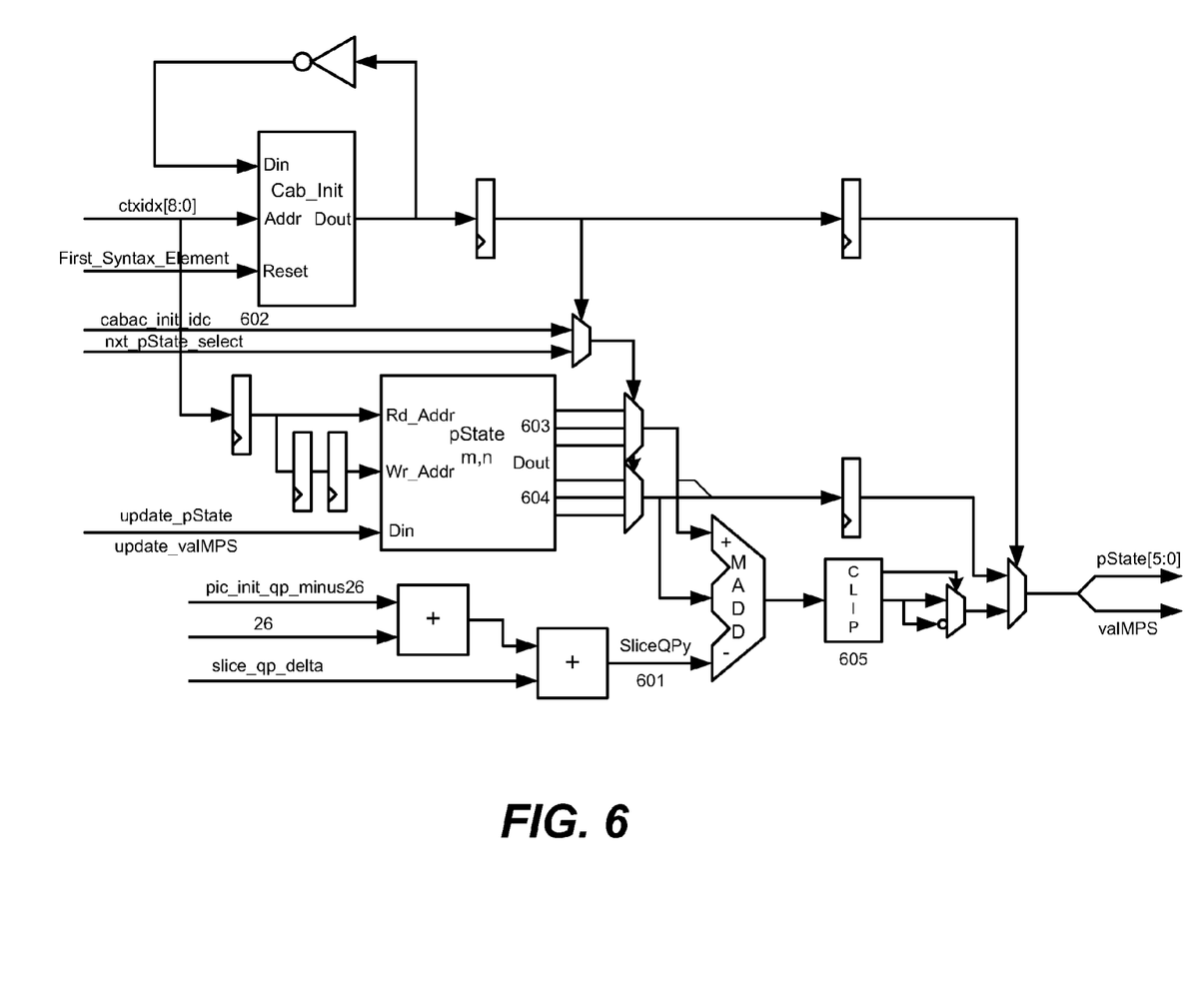
FIG. 6 depicts a CABAC pState and valMPS On Demand Initialization and Fetching Implementation.

FIG. 5 shows a general block diagram for a 2-bit CABAC decoder. When a new slice decoding starts the Context based asserting the reset signal initializes Probability States. The init_Ctx 501 is the Context that will be initialized and the couple init_pState[5:0] 502 and init_valMPS 503 are the associated initial values. These are either calculated on demand or sequentially at the beginning of slice decoding or loaded from main memory. FIG. 6 depicts a CABAC pState and valMPS On Demand Initialization and Fetching Implementation. The initialization is dependent of SliceQPy 601 and cabac_init_idc 602. SliceQPy is the slice quantization factor and varies from 0 to 51. The cabac_init_idc is determined at picture level and can vary from 0 to 2.

When large external Dram or Flash based memory is available it is advantageous to pre-calculate the pState and valMPS for all possible SliceQPy and cabac_init_idc and store it in the external memory. When the SliceQPy is decoded the data is fetched for all contexts and stored in the lookup tables. This can be done 128-bit at a time, with negligible performance impact. Following is the algorithm used for initialization:

1. preCtxState=Clip3(1, 126, ((m*SliceQPy>>4)+n)).
2. IF (preCtxState<=63) THEN
a. pSateIdx=63−preCtxState.
b. valMPS=0.
3. ELSE
a. pStateIdx=preCtxState−64.
b. valMPS=1.

The values m 603 and n 604 are fetched from a table maintained per Context and for each three values of cabac_init_idc. The function Clip3(l,u,v) 605 clips the value v to the range [l,u].

Figure 7:
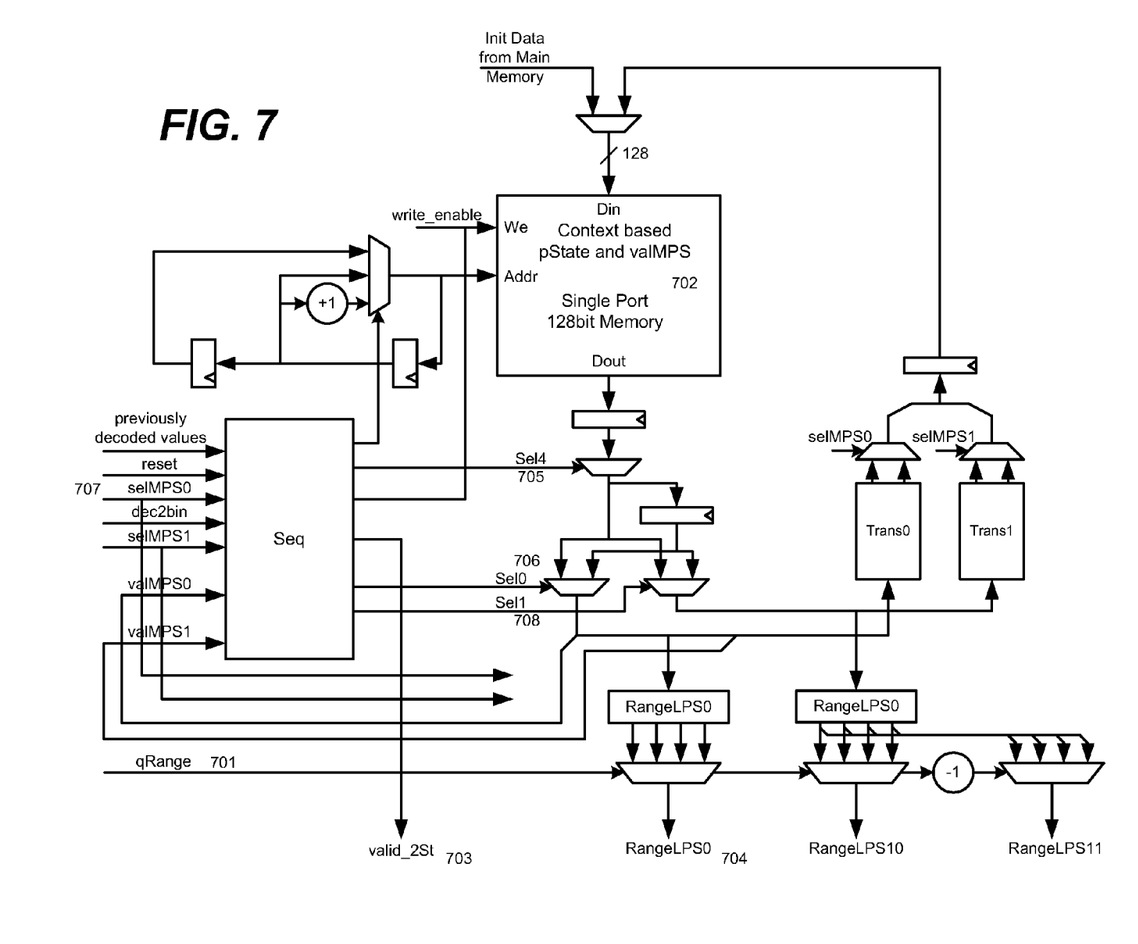
FIG. 7 depicts a CABAC pState and valMPS Initialization and Fetching for Up to 2 bin Decode Implementation.

FIG. 7 shows a possible implementation for context based pState and valMPS initialization, fetching and updating. It also provides the RangeLPS values for the current pState and most probable next pState, using the current qRange 701 and assuming that the next qRange remains the same or decremented by one.

A single port memory 702 holds the pState[5:0] and valMPS for all Context indices. There are some Contexts that are specially organized to be able to evaluate multiple bins at a time. These are related to 4x4 block residual coefficients and account for most decoded bins. These Contexts are the pair of significant_coeff_flag and last_significant_coeff_flag that indicate which of the 16 coefficients have non-zero value and the coeff_abs_value_minus1 that encodes the actual non-zero value. Since the previously decoded values are used to decide the next context index, we will decode the rest of the contexts one bin at a time to reduce complexity.

During initialization, the Context state is written in large chunks (128-bits in our implementation). These are fetched from the external Main Memory by the DMA engine not shown here for industrial art reasons. For high speed, these could be done in dual-channel and interleaving fashion. The Sequencer controls the writes and the address increments. All contexts are written at the beginning of each slice as soon as the SliceQPy value is decoded by other means (e.g. the CAVLC option of the H.264). At the end of initialization the Sequencer starts fetching the Context state one bin at a time according to the syntax element sequence. The Sequencer de-asserts the valid_2St 703 output to indicate that only one state and RangeLPS0 704 is valid. The Sel4 705 and Sel0 706 control signals are used to select the current state output. The selMPS0 707 input indicates that the valMPS value was decoded as the current bin and it is used to determine the updated state values to be written back into the Context State Memory. The qRange[1:0] input is used to select one of the four possible RangeLPS0[7:0] values as the primary output.

When the next to be decoded syntax element becomes the pair significant_coeff_flag and last_significant_coeff_flag, the Context State Memory and the Sequencer is organized to fetch the current state as well as the next state such that two bins can be decoded in one cycle. Starting with the first coefficient in the zigzag scan order, if a zero is decoded the last_significant_coeff_flag is skipped and the next coefficient significant_coeff_flag is decoded. Otherwise, the last_significant_coeff_flag is decoded for that coefficient. If a "one" value is decoded for the last_significant_coeff_flag, the rest of the coefficients are considered to be zero and the coeff_abs_value_minius1 are decoded starting in reverse order from the last of significant coefficients.

Figure 8:
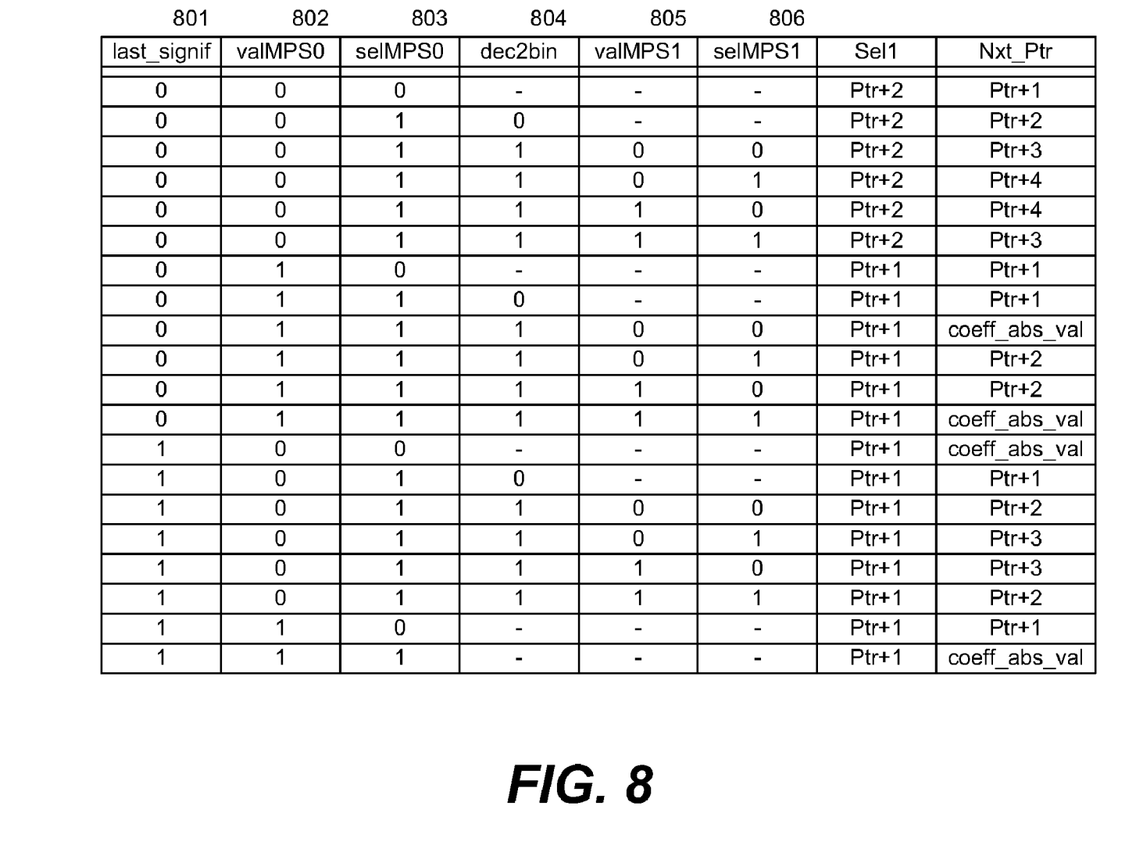
FIG. 8 presents the CABAC significant_coeff_flag sequence.

FIG. 8 shows the sequencer decision making on the Sell 708 control and incrementing the running pointer to states corresponding to significant_coeff_flag (even pointer values) and last_significant_coefficient_flag (odd pointer values). The control inputs used are:

the last_signif 801 which indicates if the current pointer is odd, pointing to a last_significant_coeff_flag state, valMPS0 802 is the current state output as the most probable symbol value, selMPS0 803 is the result of the current bin decoding indicating that the most probable symbol was selected, dec2bin 804 input indicates that 2 bins have decoded on this cycle, valMPS1 805 is the state output for the next state following the most probable symbol path, selMPS1 806 is the result of the second bin decoding indicating that valMPS1 was selected.

When last_significant_coeff_flag is decoded with a "one" then the next context sequence is to decode the coeff_abs_value_minus1.

When decoding the coeff_abs_value_minus1 the sequencing is done as follows:

A counter that starts at 0 and saturates 3 is maintained to count the number of coefficients decoded so far with an absolute value equal to one and the number of coefficients greater than one.

An absolute value equal to one is encoded as single bin of "zero". An absolute value greater than one has at least two bins, the first bin is always a "one".

The context number and the counter is incremented at the beginning while decoding "0" value bins indicating coefficients with absolute value minus 1 equal to zero. When a "1" bin is decoded as the first bin, the second and subsequent bins for that symbol uses the counter value counting the number of coefficients encountered so far that had a value greater than one. From then on, the first bin is decoded using a context indicating that at least one coefficient with an absolute value greater than one has been decoded.

To perform decoding of two bins or more at a time the valMPS path is followed. For example, at the start we the first bin is decoded using the known context that there have been 0 decoded coefficients with absolute value equal to one. Out of the two possible next contexts, that will result by the decoding a zero bin (incrementing the context for 1 decoded coefficient with absolute value equal to one) or a one bin indicating that a coefficient greater than one has been decoded we will assume we have decoded the valMPS=0 for example, incrementing the counter by one.

Figure 9:
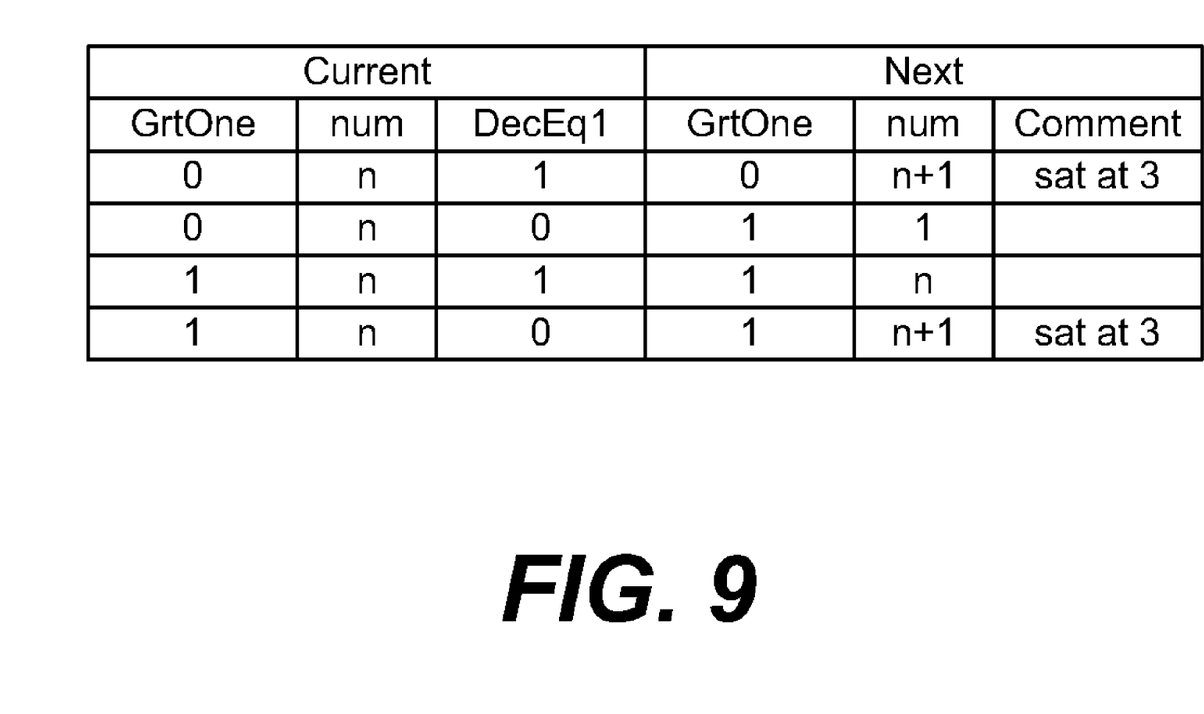
FIG. 9 presents the CABAC coeff_abs_value_minus1 sequence.

FIG. 9 shows how the context number (counter) is incremented depending on first bin value decoding 0 indicating that a coefficient with absolute value equal to one has been decoded.

Figure 10:
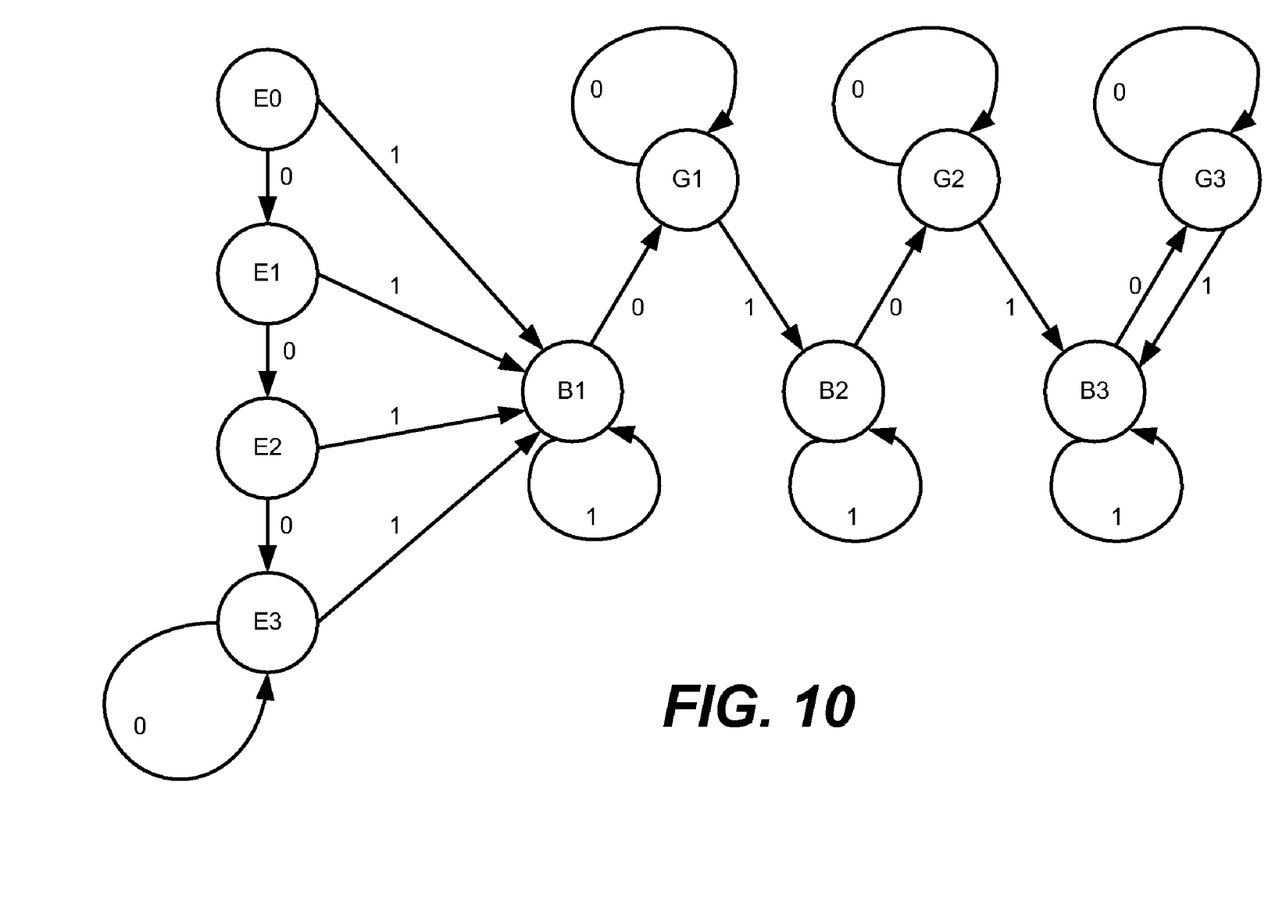
FIG. 10 shows the CABAC Coeff_abs_value_minus1 Context State transitioning.

FIG. 10 shows in more detailed the Context state transitioning. The E states count the number of coefficients with abs value equal to one, and the G and B states count the number of coefficients greater than one for the first and other bins respectively. The transition condition is the decoded bin value 0 or 1.

Figure 11:
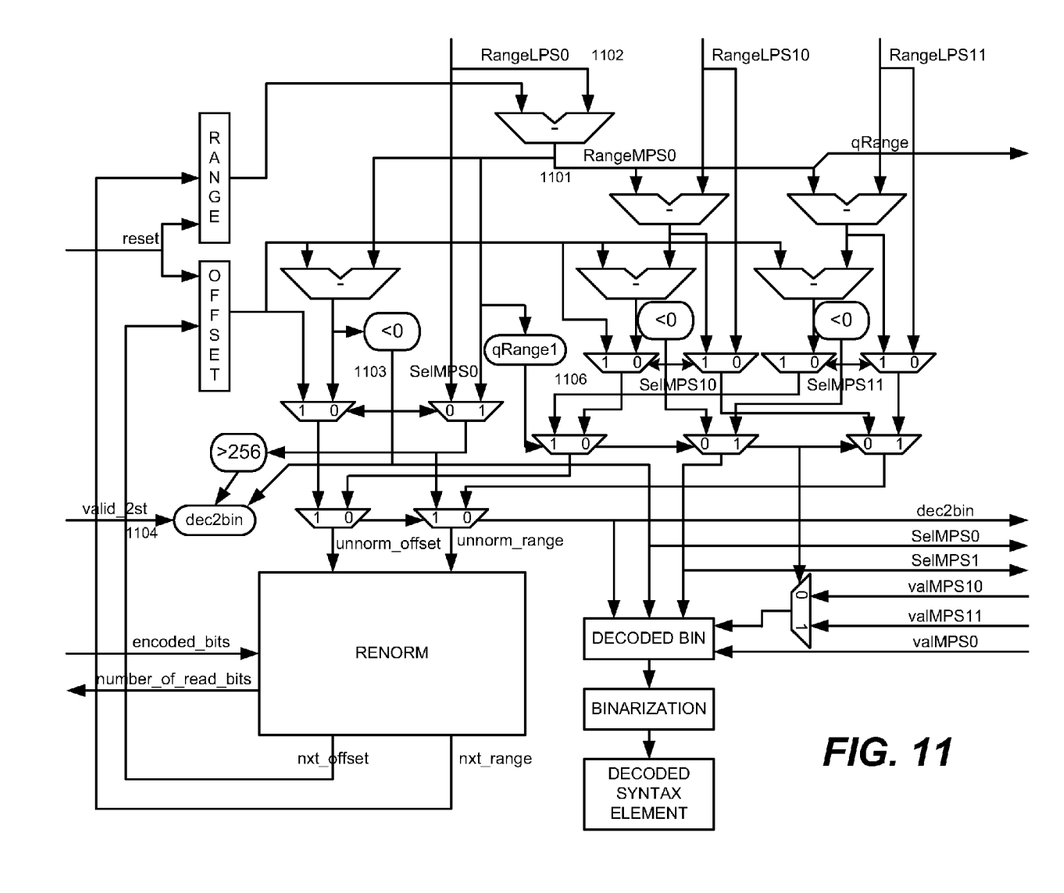
FIG. 11 depicts the CABAC 2-bin Arithmetic Decoder Section.

The arithmetic section 504 to decode multiple bins is more straightforward. FIG. 11 shows the basic block diagram for the arithmetic section capable of decoding up to two bins. First RangeMPS0 1101 is evaluated by subtracting the input RangeLPS0 1102 from the content of the current Range register. The RangeMPS0 is subtracted from the current Offset to determine selMPS0 1103. The selMPS0 selects the Offset0 and Range0 values in case a single bin is decoded and to be used as un-normalized inputs to the Renorm sub-block. The input valid_2st 1104 and the most significant bit of RangeMPS0 (significant greater than 256 value), and qRange1 1106 result are also used to determine dec2bin 1105 that indicates 2 bins are decoded. In parallel RangeMPS0 is used to evaluate the Offst1, Range1, and valMPS1 controlled by the qRange1 result. Using the most probable paths and assuming that qRange stays the same or decrements by one can similarly achieve more than 2 bin simultaneous decoding.

Figure 12:
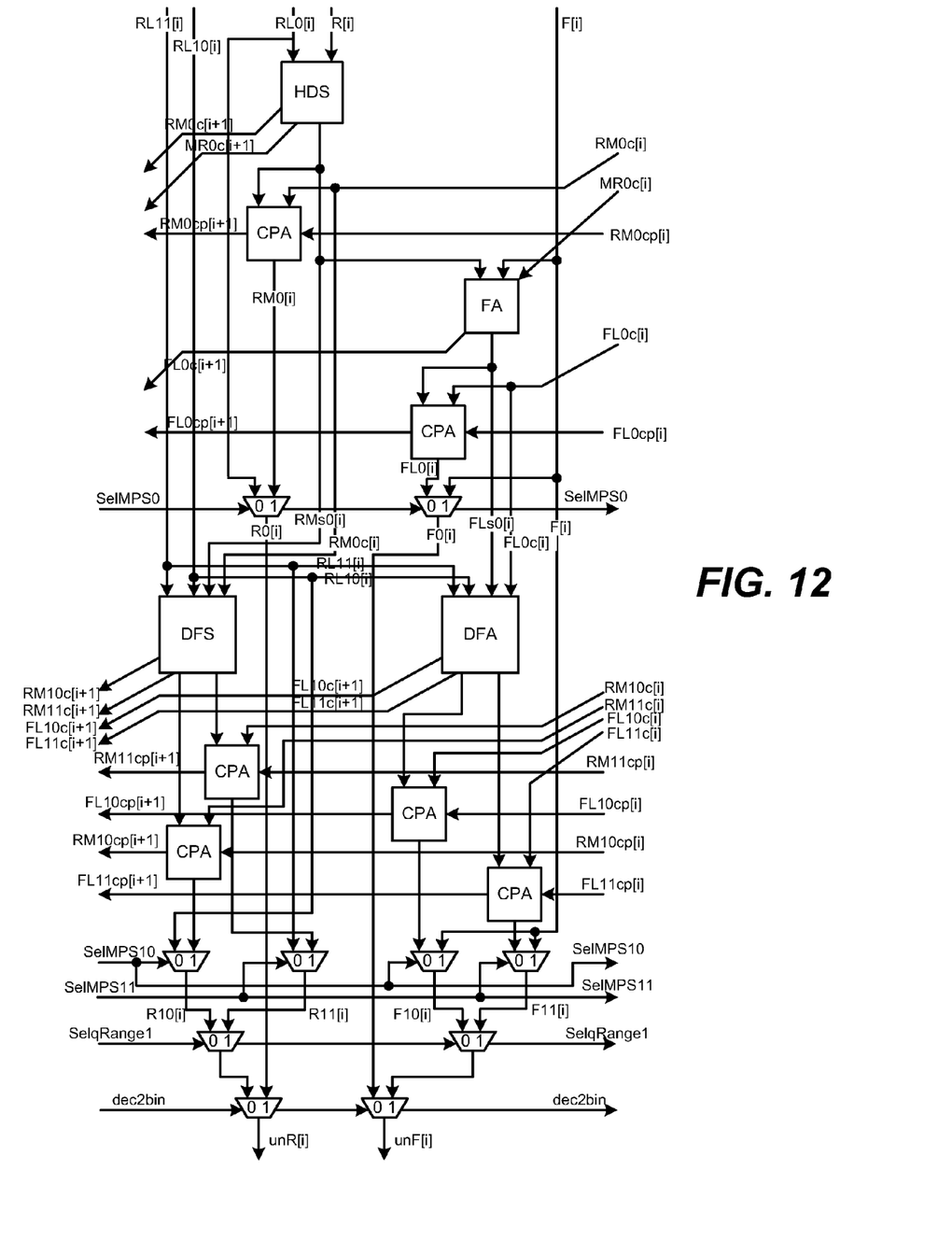
FIG. 12 depicts the CABAC 2-bin 1-bit slice Arithmetic Evaluator.

FIG. 12 shows an actual implementation of the arithmetic section as a one bit slice out of 9-bits that form the Range and Offset Registers. Some of the signal names have been shortened for conciseness and are described below:

R[i]: Bit i of Range[8:0].

F[i]: Bit i of Offset[8:0].

RL0[$i$]: Bit i of RangeLPS0[7:0], bit 8 is zero.

RL10[$i$]: Bit i of RangeLPS10[7:0], bit 8 is zero. Used if the second bin is decoded using the same qRange as the first bin.

RL11[$i$]: Bit i of RangeLPS11[7:0], bit 8 is zero. Used if the second bin is decoded using the qRange of the first bin minus one.

HDS: Performs a single bit subtract of the single bit operands, both ways producing the partial sum and carry (borrow) bits. With (cab, cba, s)=HDS(a,b), s=!(a^b), cab=a & !b, cba=!a & b, cab is the borrow for the a−b operation and cba is the borrow for the b−a operation. We also have s=!(cab||cba), where a^b=a & !b||!a & b.

RMs0[$i$]: Partial sum bit i for the subtraction of Range and RangeLPS. It is used to evaluate RangeMPS0 and OffsetLPS0.

RM0c[$i$]: Carry in for the i-th bit evaluation of Range−RangeLPS.

MR0c[$i$]: Carry in for the i-th bit evaluation of RangeLPS−Range.

RM0c[$i$+1]: Carry out from the i-th bit evaluation of Range−RangeLPS.

MR0c[$i$+1]: Carry out from the i-th bit evaluation of RangeLPS−Range.

CPA: Performs a fast carry propagate adder for a single bit. When (co, s)=CPA(a, b, ci), we have t=a^b; s=(ci ? !t, t); co=(ci ? a||b, a&b).

RM0cp[i]: Carry in for the i-th bit evaluation of RangeMPS=Range−RangeLPS. RM0cp[7] is also used to determine qRange1.

RM0cp[i+1]: Carry out from the i-th bit evaluation of RangeMPS=Range−RangeLPS.

FA: Performs a one bit Full Adder function similar to CPA all inputs are assumed to arrive at the same time.

FL0c[$i$]: Carry in for the i-th bit evaluation of Offset+RangeLPS−Range.

FL0c[$i$+1]: Carry out from the i-th bit evaluation of Offset+RangeLPS−Range.

FL0cp[i]: Carry in for the i-th bit evaluation of OffsetLPS=Offset+RangeLPS−Range.

FL0cp[8] is used to determine SelMPS0.

FL0cp[i+1]: Carry out from the i-th bit evaluation of OffsetLPS=Offset+RangeLPS−Range.

FLs0[$i$]: i-th bit of the partial sum of Offset+RangeLPS−Range.

FL0[$i$]: i-th bit of OffsetLPS=Offset+RangeLPS−Range.

SelMPS0: Indicates that the Most Probable Symbol value valMPS is selected as the decoded bin.

R0[$i$]: i-th bit of Range0[8:0], the next un-normalized range value for a single bin decoding.

F0[$i$]: i-th bit of Offset0[8:0], the next un-normalized range value for a single bin decoding.

DFS: Performs one-bit dual full subtract operation. When (ce, cf, se, sf)=DFS(a, b, e, f) we have sf=t^f; ce=(a||!b) & e||(a & !b); cf=(a||!b) & f||(a & !b); t=a^!b.

DFA: Performs one-bit dual full addition. When (ce, cf, se, sf)=DFA(a, b, e, f) we have sf=t^f; ce=(a||b)& e||(a & b); cf=(a||b)& f||(a & b); t=a^b.

RM10c[$i$]: Carry in for the i-th bit evaluation of Range−RangeLPS0−RangeLPS10.

RM11[$i$]: Carry in for the i-th bit evaluation of Range−RangeLPS0−RangeLPS11.

RM10c[$i$+1]: Carry out from the i-th bit evaluation of Range−RangeLPS0−RangeLPS10.

RM11c[$i$+1]: Carry out from the i-th bit evaluation of Range−RangeLPS0−RangeLPS11.

FL10c[$i$]: Carry in for the i-th bit evaluation of Offset−Range+RangeLPS0+RangeLPS10.

FL11c[$i$]: Carry in for the i-th bit evaluation of Offset−Range+RangeLPS0+RangeLPS11.

FL10c[$i$+1]: Carry out from the i-th bit evaluation of Offset−Range+RangeLPS0+RangeLPS10.

FL11c[$i$+1]: Carry out from the i-th bit evaluation of Offset−Range+RangeLPS0+RangeLPS11.

RM10cp[i]: Carry in for the i-th bit evaluation of RangeMPS10=Range−RangeLPS0−RangeLPS10.

RM11cp[i]: Carry in for the i-th bit evaluation of RangeMPS11=Range−RangeLPS0−RangeLPS11.

RM10cp[i+1]: Carry out from the i-th bit evaluation of RangeMPS10=Range−RangeLPS0−RangeLPS10.

RM11cp[i+1]: Carry out from the i-th bit evaluation of RangeMPS11=Range−RangeLPS0−RangeLPS 11.

FL10*cp*[i]: Carry in for the i-th bit evaluation of OffsetLPS10=Offset−Range+RangeLPS0+RangeLPS10. FL10*cp*[8] is used to evaluate SelMPS10.

FL11*cp*[i]: Carry in for the i-th bit evaluation of OffsetLPS11=Offset−Range+RangeLPS0+RangeLPS11. FL11*cp*[8] is used to evaluate SelMPS11.

FL10*cp*[i+1]: Carry out from the i-th bit evaluation of OffsetLPS10=Offset−Range+RangeLPS0+RangeLPS 10.

FL11*cp*[i+1]: Carry out from the i-th bit evaluation of OffsetLPS11=Offset−Range+RangeLPS0+RangeLPS11.

SelMPS10: Indicates that the Most Probable Symbol value valMPS10 is selected as the second decoded bin when qRange1 is zero.

SelMPS11: Indicates that the Most Probable Symbol value valMPS11 is selected as the second decoded bin when qRange1 is one.

SelqRange1: Indicates that the qRange for the second bin that consists of Range0[8:7] is equal to Range[8:7]-1. RM0*cp*[8] is used to determine this condition.

dec2bin: Indicates that two bins are decoded, requiring SelMPS0 to be true, RangeMPS0>256, qRange1 equal to qRange0 or equal to qRange0-1.

unR[i]: i-th bit of the next un-normalized Range[8:0].
unF[i]: i-th bit of the next un-normalized Offset[8:0].

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Accordingly, it is intended that the scope of the invention be defined by the following Claims and their equivalents.

The invention claimed is:

1. A method of decoding a video bit stream using an efficient parallel algorithm, the method comprising:
   inputting and initializing from a previous video processing context;
   decoding multiple bits at a time of the previous video processing context, wherein the decoding is performed on most probable bit values for all bits except a last bit; and
   receiving the decoded multiple bits and providing an output bit stream for further video processing.

2. The method of claim 1, wherein the video bit stream includes:
   video compression techniques to encode using Advanced Video Coding (AVC) Context-based Adaptive Binary Arithmetic Coding (CABAC) algorithm.

3. The method of claim 1, wherein a next quantized range used to decode a next bit is highly predictable using a current range value and a current probability stare.

4. The method of claim 1, wherein only two sequence elements needs to be accelerated to speed up significantly the decoding process.

5. The method of claim 1, wherein the rate of bits produced is never slower than the single bit sequential method and implementation.

6. The method of claim 1, wherein the initialization and fetching is done for up to 2 bin at a time for AVC CABAC pState and valMPS which are pre-calculated and stored in a DRAM or Flash memory.

7. The method of claim 1, further including:
   utilizing an arithmetic section using carry save adders, reducing to single carry propagation for the timing critical adder paths.

8. The method of claim 2, further comprising:
   utilizing an AVC CABAC 2-bin 1-bit slice Arithmetic Evaluator.

9. A system for decoding a video bit stream using an efficient parallel algorithm, the system comprising:
   a main memory for inputting and initializing from a previous video processing context;
   a decoder for decoding multiple bits of the previous video processing context at a rime, wherein the decoding is performed on most probable bit values for all bits except a last bit; and
   a sequencer for receiving the decoded multiple bits and providing an output bit stream for further video processing.

10. The system of claim 9, wherein the video bit stream includes:
    video compression techniques to encode using Advanced Video Coding (AVC) Context-based Adaptive Binary Arithmetic Coding (CABAC) algorithm.

11. The system of claim 9, wherein the decoder further:
    decodes Most Probable bit values for all bits except a last bit decoded.

12. The system of claim 9, wherein a next quantized range used to decode the next bit is highly predictable using a current range value and a current probability state.

13. The system of claim 9, wherein only two sequence elements needs to be accelerated to speed up significantly the decoding process.

14. The system of claim 9, wherein output bit stream bit rate of bits produced is never slower than a single bit sequential method and implementation.

15. The system of claim 9, wherein the inputting and initialization is performed for up to 2 bin at a time for AVC CABAC pState and valMPS which are pre-calculated and stored in a DRAM or Flash memory.

16. The system of claim 9, further including:
    an arithmetic section using save carry save adders, reducing to single carry propagation for timing critical adder paths.

17. The system of claim 9, further comprising:
    an AVC CABAC 2-bin 10-bit slice Arithmetic Evaluator.

* * * * *